(12) United States Patent
Sapper et al.

(10) Patent No.: US 9,027,894 B2
(45) Date of Patent: May 12, 2015

(54) SUPPORT APPARATUS FOR DISPLAY DEVICES AND OTHER OBJECTS

(71) Applicants: Richard Sapper, Milan (IT); Ronald Snyder, Macungie, PA (US)

(72) Inventors: Richard Sapper, Milan (IT); Ronald Snyder, Macungie, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 14/082,403

(22) Filed: Nov. 18, 2013

(65) Prior Publication Data

US 2014/0077048 A1   Mar. 20, 2014

Related U.S. Application Data

(63) Continuation of application No. 13/482,192, filed on May 29, 2012, now abandoned.

(60) Provisional application No. 61/494,074, filed on Jun. 7, 2011.

(51) Int. Cl.
| | | |
|---|---|---|
| *E04G 3/00* | (2006.01) | |
| *F16M 13/00* | (2006.01) | |
| *F16M 11/08* | (2006.01) | |
| *F16M 11/20* | (2006.01) | |

(Continued)

(52) U.S. Cl.
CPC .............. *F16M 13/00* (2013.01); *F16M 11/08* (2013.01); *F16M 11/2014* (2013.01); *F16M 11/2092* (2013.01); *F16M 11/24* (2013.01); *F16M 13/022* (2013.01); *F16M 2200/044* (2013.01); *F16M 2200/065* (2013.01); *Y10S 248/921* (2013.01)

(58) Field of Classification Search
USPC ........... 248/278.1, 274.1, 279.1, 281.11, 920, 248/921, 922, 280.11, 918, 284.1, 558, 248/123.11, 923, 324, 325, 586, 585, 248/292.11; 361/681

See application file for complete search history.

(56) References Cited

U.S. PATENT DOCUMENTS

| | | |
|---|---|---|
| 4,844,387 A | 7/1989 | Sorgi et al. |
| 5,553,820 A | 9/1996 | Karten et al. |

(Continued)

FOREIGN PATENT DOCUMENTS

| | | |
|---|---|---|
| EP | 2119950 A2 | 11/2009 |
| GB | 2440606 A | 2/2008 |

(Continued)

OTHER PUBLICATIONS

International Search report for PCTUS2012/039934 dated Aug. 31, 2012.

(Continued)

*Primary Examiner* — Monica Millner
(74) *Attorney, Agent, or Firm* — Buchanan Ingersoll & Rooney PC (57) ABSTRACT

A support apparatus includes an arm assembly attached to a support assembly such that the arm assembly is positionable adjacent to an article of furniture such as a desk or work surface. A mounting device is attached to the arm assembly that is sized and configured to retain a display device. A vertically adjustable attachment mechanism attaches a first end of the counterbalance mechanism to the arm assembly or support assembly. The vertically adjustable attachment mechanism is sized and configured such that a vertical position of the first end of the counterbalance mechanism is adjustable via movement of at least one component of the vertically adjustable attachment mechanism.

14 Claims, 6 Drawing Sheets

(51) Int. Cl.
  *F16M 11/24*    (2006.01)
  *F16M 13/02*    (2006.01)

(56) References Cited

U.S. PATENT DOCUMENTS

| | | | |
|---|---|---|---|
| 5,687,939 A | 11/1997 | Moscovitch | |
| 5,772,174 A | 6/1998 | Hirsch et al. | |
| 5,975,472 A | 11/1999 | Hung | |
| 5,992,809 A | 11/1999 | Sweere et al. | |
| 6,012,693 A | 1/2000 | Voeller et al. | |
| 6,343,006 B1 | 1/2002 | Moscovitch et al. | |
| 6,394,403 B1 | 5/2002 | Hung | |
| 6,499,704 B2 | 12/2002 | Oddsen, Jr. | |
| 6,505,988 B1 | 1/2003 | Oddsen, Jr. | |
| 6,554,235 B1 | 4/2003 | Fortier | |
| 6,554,238 B1 | 4/2003 | Hibberd | |
| 6,679,096 B1 | 1/2004 | Lazik et al. | |
| 6,702,604 B1 | 3/2004 | Moscovitch | |
| 6,739,096 B2 | 5/2004 | Feldpausch et al. | |
| 6,857,610 B1 | 2/2005 | Conner et al. | |
| 6,863,252 B2 | 3/2005 | Bosson | |
| 6,905,101 B1 | 6/2005 | Dittmer | |
| D518,063 S | 3/2006 | Piazza et al. | |
| 7,014,157 B2 | 3/2006 | Oddsen | |
| 7,048,242 B2 | 5/2006 | Oddsen, Jr. | |
| D537,323 S | 2/2007 | Saez | |
| 7,182,301 B1 | 2/2007 | Oddsen, Jr. et al. | |
| 7,207,537 B2 | 4/2007 | Hung | |
| 7,246,780 B2 | 7/2007 | Oddsen, Jr. | |
| 7,252,277 B2 | 8/2007 | Sweere et al. | |
| 7,264,212 B2 | 9/2007 | Hung | |
| 7,338,022 B2 | 3/2008 | Hung | |
| 7,369,401 B1 | 5/2008 | Floersch et al. | |
| 7,389,965 B2 | 6/2008 | Oddsen, Jr. et al. | |
| 7,392,969 B2 | 7/2008 | Chiu et al. | |
| 7,540,457 B2 | 6/2009 | Oddsen, Jr. et al. | |
| 7,652,876 B2 | 1/2010 | Moscovitch | |
| 7,694,927 B2 | 4/2010 | Chuang | |
| 8,070,114 B2 | 12/2011 | Chen | |
| 8,245,991 B2 | 8/2012 | Hung | |
| 8,366,060 B2 | 2/2013 | Hung | |
| 2005/0133678 A1 | 6/2005 | Dittmer | |
| 2005/0284991 A1 | 12/2005 | Saez | |
| 2005/0284997 A1 | 12/2005 | Tisbo et al. | |
| 2006/0266909 A1 | 11/2006 | Oddsen, Jr. et al. | |
| 2008/0116622 A1 | 5/2008 | Fox | |
| 2008/0237439 A1 | 10/2008 | Oddsen | |
| 2009/0173860 A1 | 7/2009 | Remy | |
| 2010/0044541 A1 | 2/2010 | Sapper et al. | |
| 2011/0303800 A1 | 12/2011 | Sapper et al. | |
| 2012/0235000 A1 | 9/2012 | Borloz et al. | |

FOREIGN PATENT DOCUMENTS

| | | |
|---|---|---|
| WO | 2006132938 A2 | 12/2006 |
| WO | 2007118862 A1 | 10/2007 |
| WO | 2007137905 A1 | 12/2007 |
| WO | 200812368 A1 | 1/2008 |
| WO | 2008022873 A2 | 2/2008 |
| WO | 2008091998 A2 | 7/2008 |
| WO | 2008113860 A2 | 9/2008 |
| WO | 2009151760 A1 | 12/2009 |

OTHER PUBLICATIONS

Written Opinion of the International Searching Authority for PCTUS2012/039934 dated Aug. 31, 2012.

SUPPORT APPARATUS FOR DISPLAY DEVICES AND OTHER OBJECTS

CROSS-REFERENCE TO RELATED APPLICATION

The present application is a continuation application of U.S. patent application Ser. No. 13/482,192, which was filed on May 29, 2012 and claimed priority to U.S. Provisional Patent Application No. 61/494,074, which was filed on Jun. 7, 2011.

FIELD OF INVENTION

The present invention relates to support arms such as monitor arms and other moveable arm assemblies configured to hold objects such as monitors or liquid crystal displays.

BACKGROUND OF THE INVENTION

Support arms such as monitor supports or copy holders often include one or more arms that extend from a support post. The arm is configured to hold an object, such as a monitor. The support post is typically clamped to a support surface, such as a desk, table or partition wall. Examples of support arms and similar support apparatuses are disclosed in U.S. Pat. Nos. 7,652,876, 7,392,969, 7,389,965, 7,369,401, 7,252,277, 7,246,780, 7,182,301, 7,048,242, 7,014,157, 6,905,101, 6,863,252, 6,739,096, 6,702,604, 6,679,096, 6,554,238, 6,554,235, 6,505,988, 6,499,704, 6,343,006, 5,992,809, 5,772,174, 5,687,939, 5,553,820, D518,063, 4,844,387, and D537,323, U.S. Patent Application Publication Nos. 2011/0303800, 2010/0044541, 2005/0284997, 2005/0133678, 2005/0284991, 2006/0266909, 2008/0116622 and 2008/0237439, World Intellectual Property Publication Nos. WO 2009/151760, WO 2008/091998, WO 2008/113860, WO 2008/012368, WO 2008/022873, WO 2007/137905 and WO 2007/118862 and United Kingdom Patent Application No. GB 2,440,606.

Our U.S. patent application Ser. No. 12/372,110 and U.S. Provisional Patent Application Ser. No. 61/353,714 discloses examples of support apparatuses. The entirety of U.S. Provisional Patent Application Ser. No. 61/353,714 is incorporated by reference herein. The entirety of U.S. patent application Ser. No. 12/372,110 is incorporated herein by reference.

Various support arms require springs, such as gas springs or coiled springs, to help support an object at a particular location and permit positioning adjustment of the support arm. For instance, World Intellectual Property Publication No. WO 2007/118862 discloses a support arm that requires a gas spring and a cable to support an object held by the arm in a particular position. The support arm also has a sleeve that may be slid over a cylindrical support post for attachment to the support post. The use of cables often detracts from the aesthetic effect of the support arm. The use of exposed springs or gas springs can also detract from the aesthetic effect of a support arm. Moreover, the use of springs and cables to support an object often increase the cost of fabricating such support apparatuses.

Further, gas springs used in support arms are often not adjustable by a user. The initial setting of the gas spring made by an installer or manufacturer is often, if not always, utilized for the setting to control the ability of the monitor arm to adjust to new positions or to retain objects such as monitors of certain weights. As a result, a user is usually unable to adjust the way in which a monitor arm may be moved to adjust an amount of force needed to change a position of the monitor arm or object held by the monitor arm to meet a user's particular preference.

A support apparatus is needed that can permit a user to easily adjust the position of one or more objects held by the support apparatus. Preferably, the support apparatus permits a user to adjust the force required to adjust the position of the monitor arm or other support apparatus so that the device may be adjusted to accommodate a user's particular preference in a way that is relatively easy for the user.

SUMMARY OF THE INVENTION

A support apparatus includes a counterbalance mechanism. One end of the counterbalance mechanism may be attached to a portion of an arm assembly or a support supporting the arm assembly so that the end of the counterbalance mechanism may be vertically adjustable while attached to that element of the support apparatus. Preferably, the end of the counterbalance mechanism is vertically adjustably attached to the support or arm assembly. The arm assembly of the support apparatus may be configured to hold and maintain the position of an object such as a display device. A display device may be a monitor, television, liquid crystal display or other device configured to allow a user to view an image.

Some embodiments of the support apparatus may be configured to include a gas spring. For instance, a support apparatus may include an arm assembly attached to a support assembly. A mounting device may be attached to the arm assembly that is sized to retain at least one display device such as a monitor, television or display unit. A gas spring may extend between opposite ends of the arm assembly. The gas spring may have a first end and a second end opposite the first end of the gas spring. A vertically adjustable attachment mechanism may directly attach the first end of the gas spring to one of the arm assembly and the support assembly. The vertically adjustable attachment mechanism is sized and shaped so that a vertical position of the first end of the gas spring is adjustable via movement of at least one component of the vertically adjustable attachment mechanism.

Other embodiments of the support apparatus may be configured so that a counterbalance mechanism is attached to at least one of a support assembly and a first end of an arm assembly so that an end of the counterbalance mechanism is vertically adjustable from a first position to at least one second position that is higher or lower than the first position. The vertical adjustment of the end of the counterbalance mechanism adjusts an amount of weight of a display device that is maintainably supportable by the arm assembly. A vertically adjustable attachment mechanism moveably attaches the end of the counterbalance mechanism to one of the arm assembly and the support assembly to moveably attach the end of the counterbalance mechanism so that the end of the counterbalance mechanism is vertically adjustable via movement of at least one component of the vertically adjustable attachment mechanism.

Some embodiments of the support apparatus may include a mechanical tool. The mechanical tool may be releasably retained by the mounting device. The mechanical tool may be usable to adjust a vertical position of a first end of the gas spring or an end of a counterbalance mechanism via rotation of a rotatable member component of the vertically adjustable attachment mechanism caused by the mechanical tool engaging the rotatable member wile rotating to rotate the rotatable member. A user may use the tool to thereby adjust the position of the end of the gas spring or other counterbalance mechanism.

Some embodiments of the support apparatus may include a mounting mechanism. The mounting mechanism may be attached to the support assembly. The mounting mechanism may include a clamp for attaching to a portion of a work surface or a wall of paneling for example so that the support apparatus can be attached to that structure for positioning the arm assembly adjacent a work surface or other article of furniture.

The vertically adjustable attachment mechanism may include a number of different components. For instance, the vertically adjustable attachment mechanism may include a receiving body that is attached to the arm assembly. Such an attachment may be a moveable attachment. Alternatively, such an attachment may be an affixation that prevents movement of the receiving body independent of the arm assembly. The vertically adjustable attachment mechanism may also include a rotatable member that is attached to the receiving body and is rotatable so that movement of the rotatable member raises a position of an end of the gas spring or other counterbalance mechanism when rotated in one direction and lowers the position of the end of the gas spring or other counterbalance mechanism when rotated in an opposite direction. The end of the gas spring or counterbalance mechanism may be directly attached to the rotatable member or may be attached to a nut or other moveable body that is moveably attached to the rotatable member. For instance, the nut or other moveable body may be attached to the rotatable member and the end of the gas spring or other counterbalance mechanism may be positioned on the nut or other moveable body so that vertical movement of the nut or other moveable body causes the end of the gas spring or other counterbalance mechanism to vertically move as well. In some embodiments the rotatable member is a bolt or screw and the nut or other moveable member has threads that mate with the threads of the rotatable member so that rotation of the rotatable member causes the nut or other moveable member to move along the threads of the rotatable member.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of a support apparatus are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
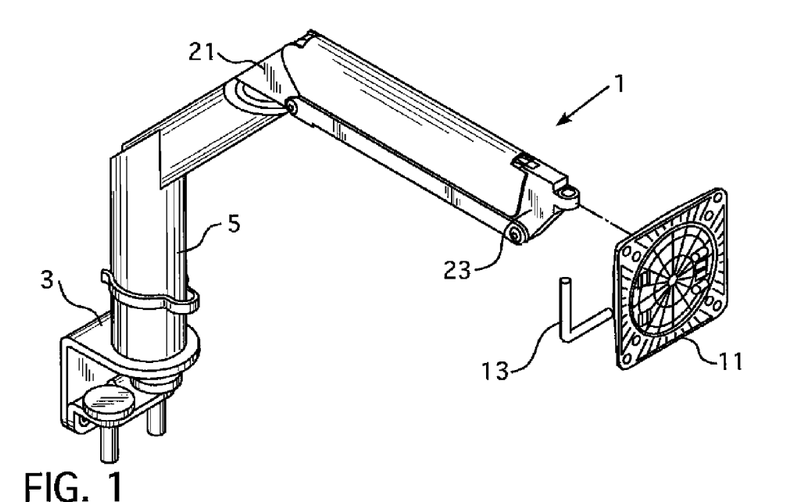
FIG. 1 is a perspective view of a first present preferred embodiment of a support apparatus showing a mounting device being attached to an end of the arm assembly. The mounting device includes a groove or other mechanism for releasably retaining an Allen wrench or other mechanical tool that may be used to adjust the position of the gas spring or the force of the gas spring.
Figure 2:
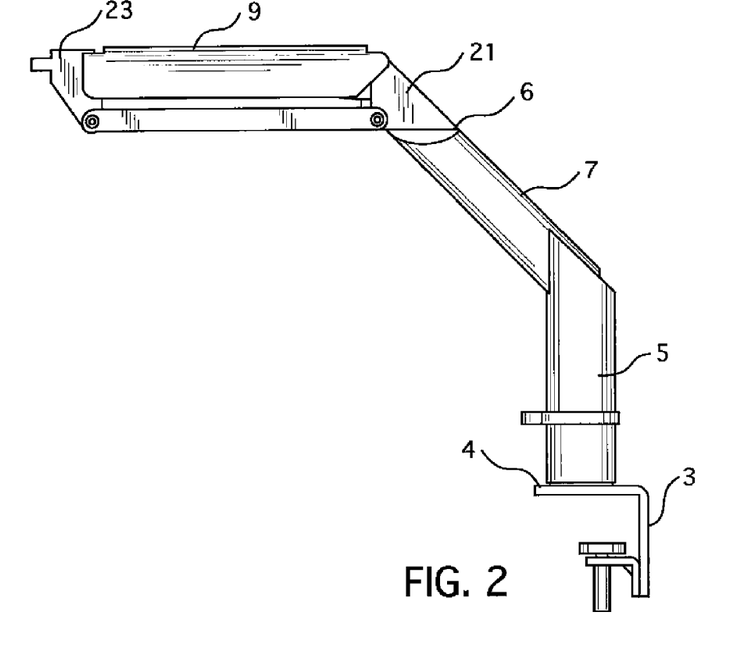
FIG. 2 is a side view of the first present preferred embodiment of the support apparatus with the mounting device cut away.
Figure 3:
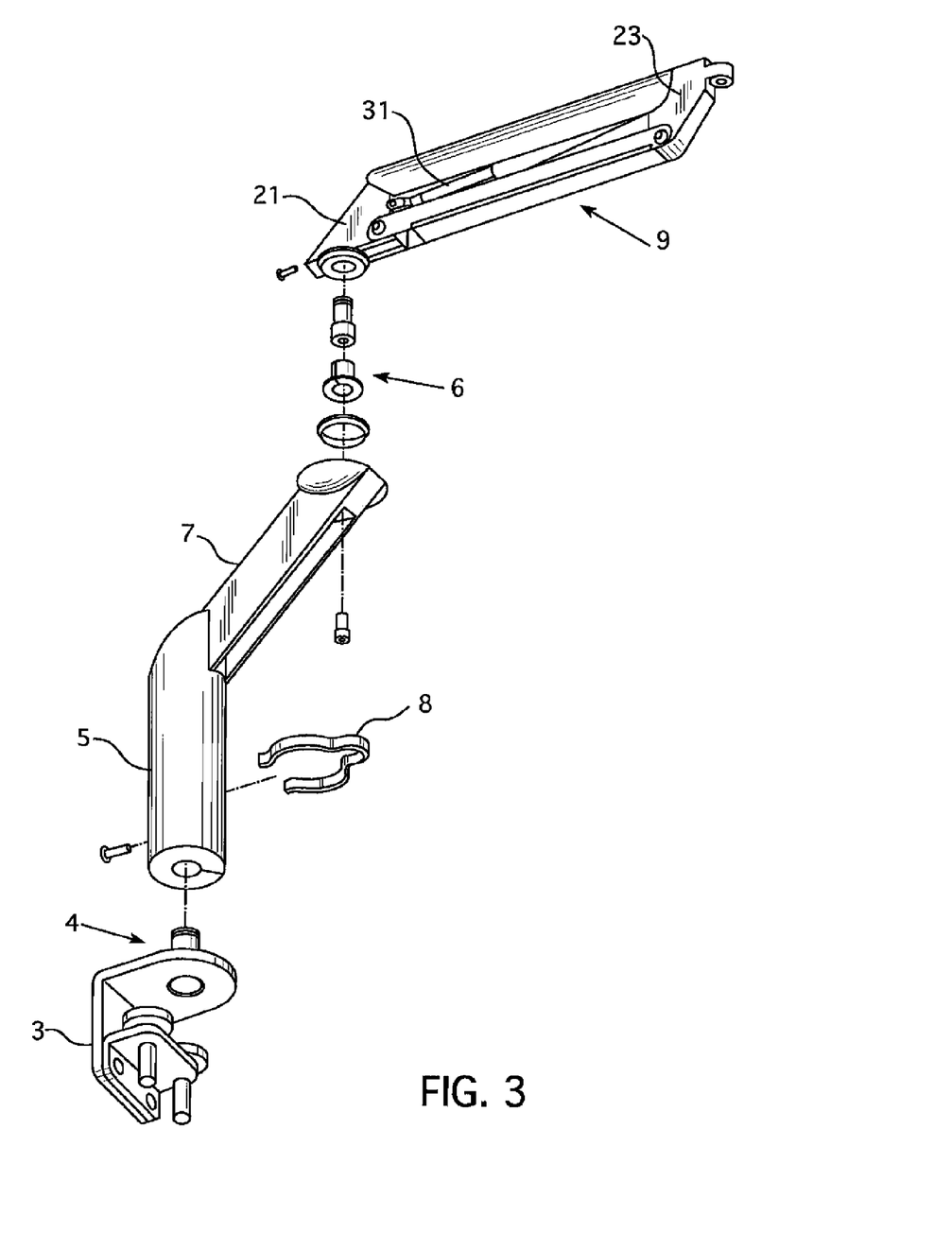
FIG. 3 is an exploded view of the first present preferred embodiment of the support apparatus.
Figure 4:
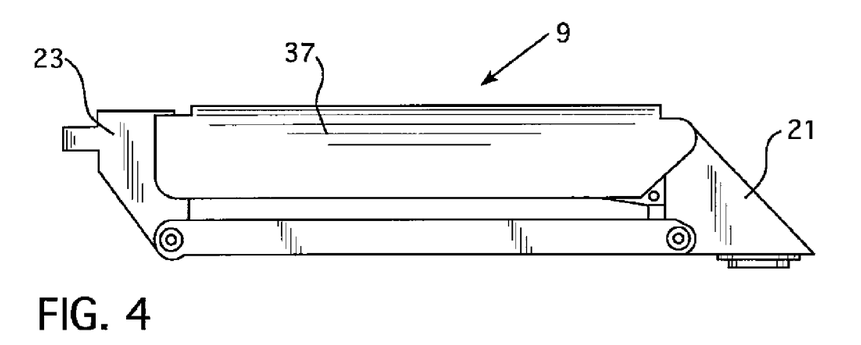
FIG. 4 is a side view of the arm assembly of the first present preferred embodiment of the support apparatus.
Figure 5:
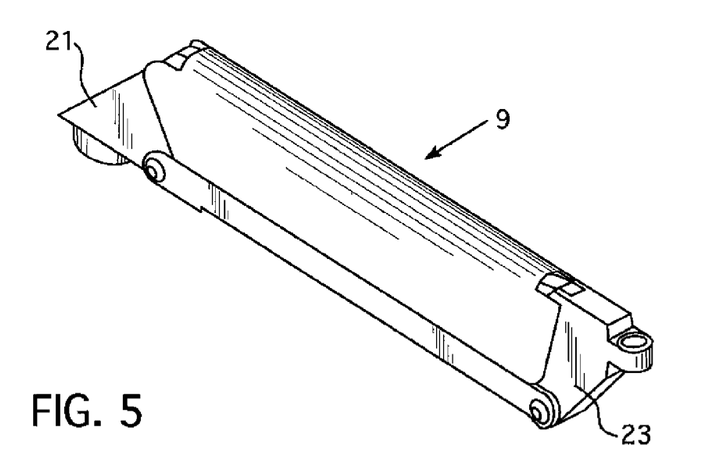
FIG. 5 is a perspective view of the arm assembly of the first present preferred embodiment of the support apparatus attached to the gas spring of the first present preferred embodiment of the support apparatus.
Figure 6:
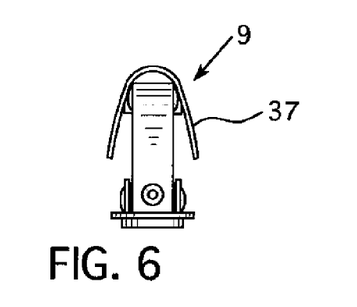
FIG. 6 is a rear view of the arm assembly of the first present preferred embodiment of the support apparatus attached to the gas spring of the first present preferred embodiment of the support apparatus.
Figure 7:
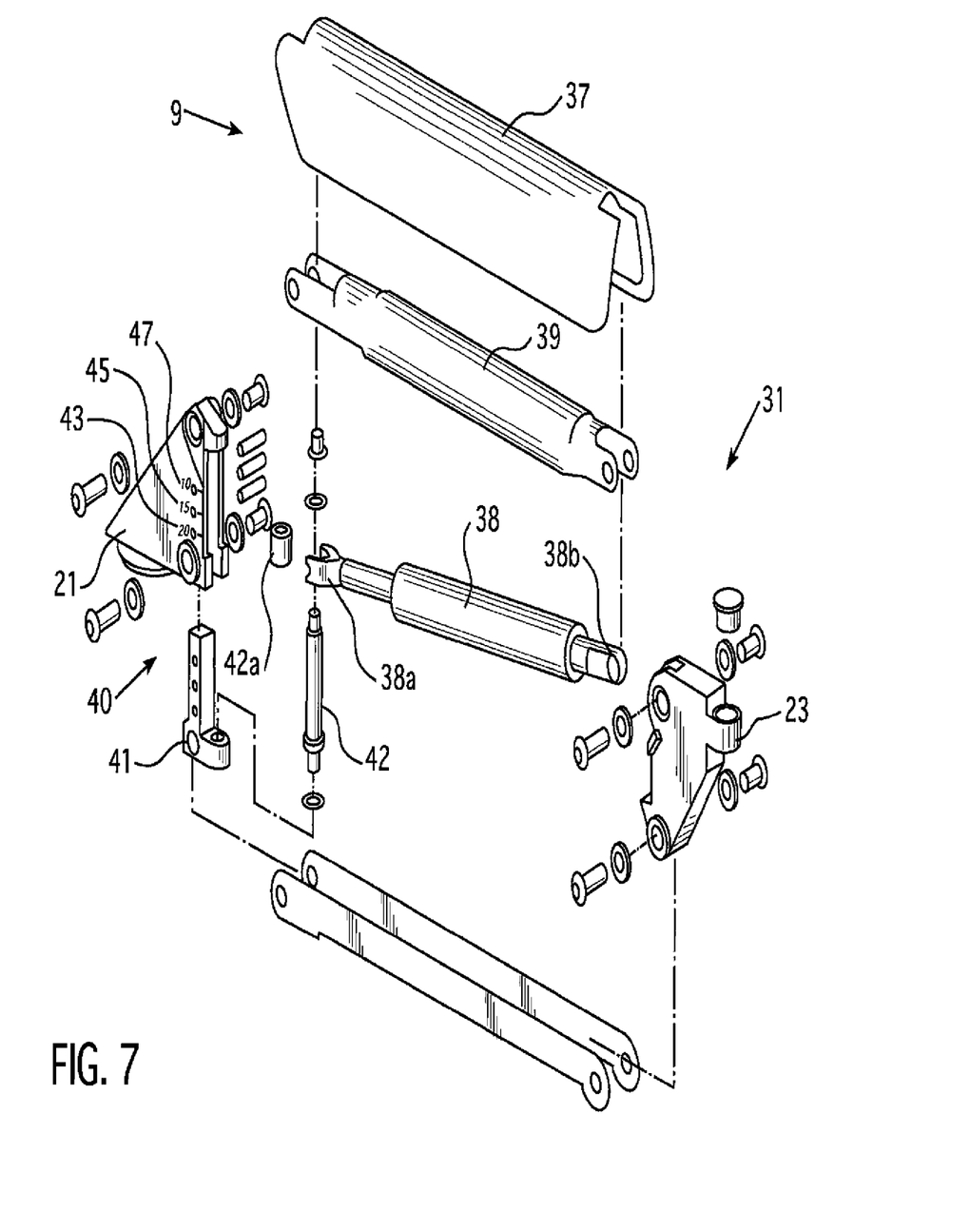
FIG. 7 is an exploded fragmentary view of the first present preferred embodiment of the support apparatus illustrating the arm assembly attached to the gas spring.
Figure 8:
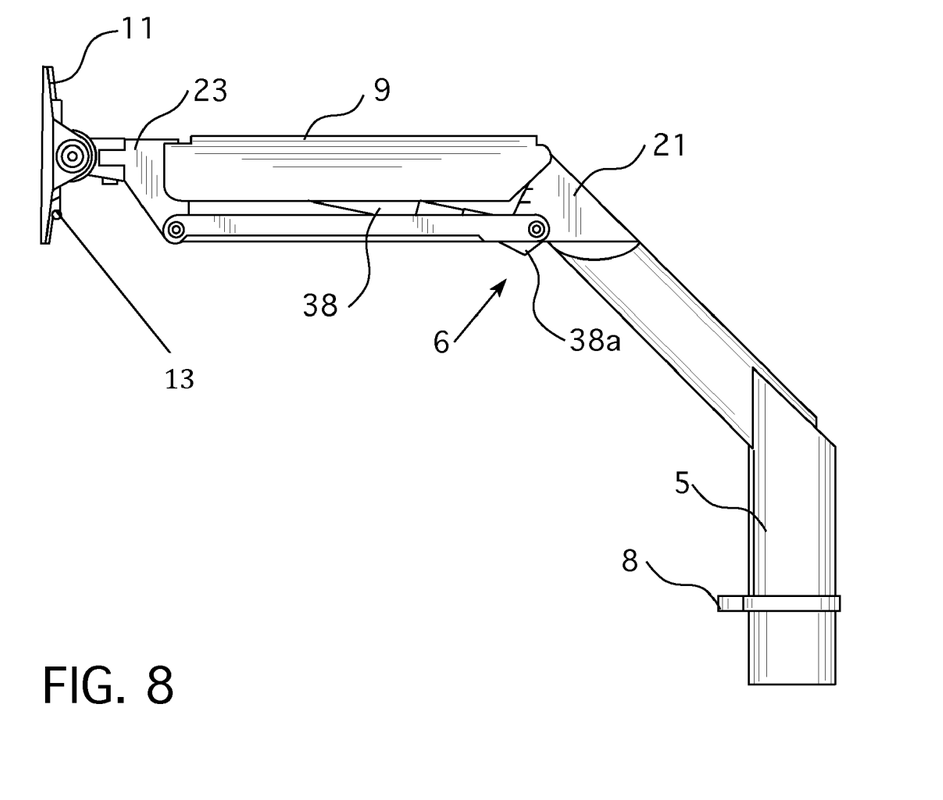
FIG. 8 is a side view of a second present preferred embodiment of the support apparatus.
Figure 9:
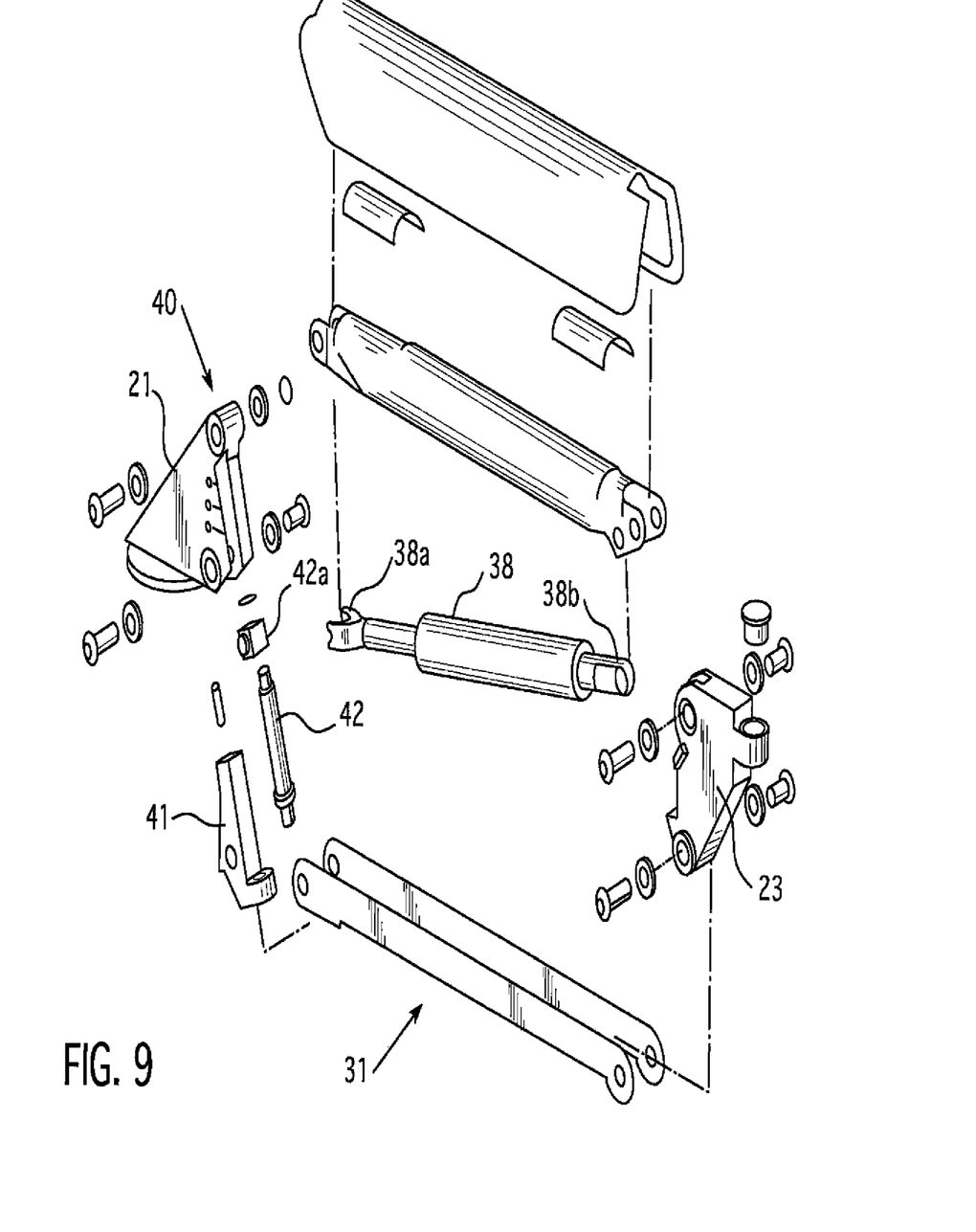
FIG. 9 is an exploded view of an embodiment of a vertically adjustable attachment mechanism and counter balance mechanism attached thereto that may be utilized in embodiments of the support apparatus.

Referring to FIGS. 1-9, a support apparatus 1 may be configured to serve as a monitor arm or a support device used to moveably support televisions, monitors, liquid crystal displays, or other display devices used in computers, computer devices or other electronic equipment. The support apparatus 1 may include a mounting mechanism 3, such as a clamp or weighted support that is sized and configured to hold or retain the support apparatus on an article of furniture, such as a desk or tabletop. The mounting mechanism 3 may alternatively be a bracket that permits fasteners to be extended through a work surface, such as a desk top or tabletop, to a post or other support to attach the support apparatus to the article of furniture.

The support apparatus may include a support that has a post 5 that is attached to an angled member 7 that extends from the post 5. The support may be rotatably attached to the mounting mechanism 3 at a bottom end 4 of the support. For instance, as may be appreciated from FIG. 3, the bottom end 4 of the post 5 may be rotatably attached to the mounting mechanism 3 by a bolt, axle, or other fastener that extends into a hole formed in the bottom end 4 of the post to rotatably move about that bolt, axle, or other fastener.

The angled member 7 may be affixed to an upper end of the post or other portion of the post 5 or may be an integral part of post 5. An end 6 of the member 7 may be rotatably attached to a first end 21 of an arm assembly 9. For instance, a bolt or axle may be positioned in an end of the angled arm assembly 7 and extend into a hole formed in a first end 21 of the arm assembly 9 that receives the axle to rotatably connect the arm assembly to the member 7. The axle may define the axis of rotation for the arm assembly 9.

The arm assembly 9 may also include a second end 23 that is opposite the first end 21. The second end 23 may be configured for attachment to a mounting device 13 that is configured to attach a display device, such as a monitor, to the arm assembly. Preferably, the mounting device 11 is the same or similar to the mounting plate or other mounting device for display devices disclosed in our U.S. patent application Ser. No. 12/372,110.

The mounting device 11 may include a groove or other aperture that is sized and configured to mate with a portion of an Allen wrench 13 or other mechanical tool. The Allen wrench 13 may be releasably retained by the groove or other aperture or structure defined in a portion of the mounting device 13. Preferably, the mounting device 11 is configured so that the Allen wrench is releasably retained on a rear side of the mounting device so that the Allen wrench is generally hidden from view so it does not unnecessarily detract from the aesthetic effect of the support apparatus while still providing functionality that may be useful to a user.

A cable management bracket 8 may be attached to the post to help retain cords that may extend from a device held by the support apparatus. For example, the cable management bracket 8 may retain a power cord and video data communication cord that runs from a computer to a monitor or display held by the mounting device 11 so that these wires or cables run near the post 5, angle arm 7, and arm assembly 9 to the display device held by the mounting device 11.

The arm assembly 9 may include one or more interconnected arm members. The arm assembly 9 may also include a counterbalance mechanism 31, which may include a gas spring 38. Gas spring 38 may also be referred to as a gas strut or gas damper. The gas spring 38 is attached between the first end 21 of the arm assembly 9 and the second end 23 of the arm assembly. The gas spring 38 may be covered or enclosed by a shroud 39 that is configured to hide the gas spring 38 or substantially hide the gas spring 38 from view to improve the aesthetic effect of the support apparatus 1. The shroud may also cover any pivotal connections between ends of the gas spring or other elements of the arm assembly 9 to help prevent a user from accidentally pinching a finger or otherwise becoming injured when adjusting a position of the arm assembly 9.

The gas spring 38 may be rotatably attached to the first end 21 of the arm assembly 9. The rotatable attachment may permit the second end 23 of the arm assembly to be vertically adjusted via rotational movement of the arm assembly 9 about the rotatable attachment or pivot attachment of the gas spring 38 to the first end 21 of the arm assembly 9. The vertical adjustment acts in combination with rotational adjustability provided by the rotational attachments at the bottom 4 of the post 5 and the upper end 6 of the member 7. Of course, a monitor may have its position further adjusted via pivotal attachment of the mounting device 13 to the second end 23 of the arm assembly and rotational or vertical adjustment provided via components of the mounting device 13.

It should be understood that the arm assembly 9 may include one or more arm members or arm linkages connected together. For such embodiments, the gas spring 38 may be attached between the opposite ends of the entire arm assembly. For instance, the gas spring 38 could be attached between ends of one arm of the entire arm assembly or may be positioned between two or more arm members of the arm assembly. One end of the gas spring is preferably attached to an end of one of the arm members of the arm assembly or a distal end of the arm assembly. That one end is preferably vertically adjustable via the attachment mechanism that attaches that end of the gas spring to the arm assembly. Examples of such attachment mechanisms are discussed more fully below.

The counterbalance mechanism 31 may also include a housing 39 that has a channel sized to receive the gas spring 38 to cover the gas spring 38. The housing may have ends that are attached to the ends of the gas spring and also the ends 21 and 23 of the arm assembly 9. The housing 39 is preferably composed of steel and may define a channel sized and configured to cover the gas piston or to enclose a portion of the gas spring 38. The housing 39 may be sized and configured so that it may permit the shroud 37 to be adhered to the housing 39 to cover the housing and pinch points of the arm assembly 9 without requiring mechanical fasteners and without requiring the shroud 37 to be directly attached to the gas spring 38.

A middle chamber of the gas spring 38 may retain gas or other fluid and be configured to receive a portion of a rod that extends out of and into the chamber. It should be appreciated that in some contemplated embodiments, the gas spring may utilize a liquid as the fluid instead of a gas. The gas or other fluid within the chamber may define an amount of force needed to extend or retract the rod from the chamber. The rod encircled by the chamber that is extendable from the chamber may have a first end 38*a*. A second end 38*b* of the gas spring 38 may be positioned opposite this first end 38*a*. The first end 38*a* may be rotatably and also vertically moveably attached to the first end of the arm assembly 21. The second end 38*b* may be rotatably attached to the second end 23 of the arm assembly 9 or may be immovably affixed to the second end 23 of the arm assembly 9.

The gas or other fluid in the chamber of the piston may provide a force or pressure that must be overcome to extend or retract the end 38*a* of the rod into or out of the chamber. This force permits the gas spring 38 to help maintain the position of an object, such as a display device, that may be attached to the second end 23 of the arm assembly 9 because the weight of the object may not be sufficient to overcome the force needed to move the end 38*a* of the gas spring. A user must apply the force necessary to overcome the force of the gas or other fluid in the chamber of the gas spring 38 to move the end 38*a*, which permits the user to readjust the position of the object as desired. The gas or other fluid within the chamber, however, also permits the gas spring to help maintain the user selected position after the user stops adjusting the position of the object held by the arm assembly 9 by preventing the end 38*a* to further extend or retract once the user's exerted force has been stopped.

The first end 21 of the arm assembly 9 may include a vertically adjustable attachment mechanism 40 that connects the first end 38*a* of the gas spring to the first end 21 of the arm assembly so that a vertical position of the first end 38*a* of the gas spring can be vertically adjusted to one of a number of different positions. Each position may change the mechanical arrangement of the gas spring 38 relative to the arm assembly so that the amount of force that a user must provide to extend or retract the moveable rod of the gas spring from the piston chamber is adjustable. Further, such a vertical adjustment to the position of the first end 38*a* of the gas spring 38 may change the amount of weight the arm assembly 9 may support for maintaining a display device in a particular user selected position.

The adjustment of the amount of force needed to move or retract the gas spring 38 affects the weight of an object the arm assembly 9 can hold in a particular position or orientation. For instance, in one vertical position for first end 38*a*, the arm assembly 9 may be able to maintain the position of a monitor weighing fifteen pounds in any of a number of positions a user may move the arm assembly 9 via pivoting upward movements or rotational movements about the connection the first end 38*a* of the gas spring 38 has with the first end 21 of the arm assembly 9. In contrast, the vertical position of the first end 38*a* may be changed so that the arm assembly is no longer able to maintain such a position for a fifteen pound object, but instead can only maintain such a position for an object of up to ten pounds. Of course, the arm assembly may be configured to permit a number of other vertical adjustments to the position of the first end 38*a* of the gas spring to affect the holding of objects that are under ten pounds or over fifteen pounds as well. For instance, the first end 38*a* may be vertically adjustably attached to the first end 21 of the arm assembly so that adjustment of the first end 38*a* of the gas spring may change the amount of force that is supportably by the second end 23 of the arm assembly in the range of twenty pounds to five pounds or twenty pounds to ten pounds.

The vertically adjustable attachment mechanism 40 that may be utilized to provide a vertically adjustable attachment of the first end 38*a* of the gas spring 38 of the counterbalance mechanism 31 to the first end 21 of the arm assembly may include a receiving body 41, or keeper, that retains a fastener such as a bolt, screw or other type of rotatable member 42 that extends vertically through the first end 38a of the gas spring 38 to connect the receiving body 41 to the first end 38a. In some embodiments of the vertically adjustable attachment mechanism 40, the receiving body 41 may be affixed to the first end 21 so that it is not moveable. A nut or moveable body 42a may be positioned on the rotatable member 42 and may be moveable when the rotatable member is rotated such that the moveable body 42a may move vertically when the rotatable member is rotated. For instance, the moveable body 42a may have threads that mate with threads on the rotatable member and may move vertically along a path defined by the threads of the rotatable member when the rotatable member is rotated. The first end 38a of the gas spring 38 may be attached to the moveable body, rest upon the moveable body or may engage the moveable body so that when the moveable body moves vertically, the first end 38a also moves vertically.

The moveable body 42a may include a projection that fits within a groove formed in the receiving body. The groove of the receiving body may mate with the projection of the moveable body 42a so that the moveable body is prevented from rotation as a result of the position of the projection within the groove. The moveable body 42a may be further prevented from rotation when the rotatable member 42 is rotated by a direct attachment to the first end 38a of the gas spring 38. The combination of the projection of the mateable body 42a within the groove of the receiving body 41 and the attachment of the first end 38a of the gas spring 38 to the moveable body 42a may help prevent the moveable body from becoming damaged or experiencing excessive torque when the rotatable member is rotated to adjust the position of the moveable body 42a so that the life of the moveable body 42a may be extended.

At least one side of the first end 21 may include indicia 43, 45, and 47 that identify different positions for the rotatable member 42, nut or moveable body 42a attached to the rotatable member that may move upon rotation of the rotatable member 42 and may also identify the different force settings those positions represent. For instance, indicia 43 may be the written number twenty to identify the fact that when the moveable body 42a is in that position, the gas spring 38 permits the arm to suspend and hold a device that weighs up to twenty pounds. Indicia 45 and 47 may also include indicia indicating the amount of weight that is supportable by the arm assembly when the first end 38a of the gas spring 38 is vertically adjusted via movement of the rotatable member 42 and moveable body 42a. For example, indicia 45 may indicate that a middle position of the moveable body 42a positions the first end 38a of the gas spring 38 to help maintain a position of a device via the arm assembly 9 and mounting device 11 that weighs up to sixteen pounds and indicia 47 may identify an upper position of the receiving body that positions the first end 38a of the gas spring 38 to maintain the position of a display device weighing up to ten pounds. It should be understood that any number of positions for the moveable body 42a and first end 38a of the gas spring 38 may be defined via the rotatable member of the attachment mechanism 40.

The receiving body 41 may be affixed to the first end 21 of the arm assembly 9 so that it does not move relative to the first end 21. The receiving body 41 may be attached to the first end 38a of the gas spring 38 via a fastening mechanism that includes the rotatable member 42 and moveable body 42a, which may be, for instance, a nut. The rotatable member 42 may be positioned and configured so that an Allen wrench or other mechanical tool such as a screwdriver may be positioned under the rotatable member 42 to engage the rotatable member 42 and rotate the rotatable member 42 in different directions. The rotation of the rotatable member 42 may cause the rotatable member to rotate between the receiving body 41 and the first end 21 of the arm assembly 9 to vertically move the moveable body 42a on the rotatable member 42. For instance, the moveable body 42a may move along threads formed on the rotatable member 42 to different positions along the rotatable member 42.

The rotation of the rotatable member 42 in different directions may raise or lower the position of the moveable body 42a and the first end 38a of the gas spring 38. For instance, an Allen wrench 13 may be used to rotate the rotatable member 42 in a clockwise direction to cause the moveable body 42a to move downward to lower the position of the first end 38a that is supported on the moveable body 42a. Conversely, an Allen wrench 13 may be used to rotate the rotatable member in a counterclockwise direction to cause the moveable body 42a to move to a higher position. It should be appreciated that movement of the rotatable member 42 within the receiving body 41 or first end 21 of the arm assembly may define the path of vertical movement of the moveable body 42a and first end 38a of the gas spring 38.

The rotatable member 42 may be positioned so that its length extends perfectly vertically or substantially vertically. For instance, the rotatable member 42 may be positioned so its length extends substantially vertically as shown in the embodiment of the support apparatus illustrated in FIGS. 8-9. Such a length may extend at an angle relative to the length extending perfectly vertically such as a ten degree angle, fifteen degree angle or forty degree angle relative to a length extending perfectly vertical. Such a configuration may result in an end 38a of the gas spring being attached at a position that is lower as compared to embodiments where the rotatable member is perfectly vertical. The lower attachment position may help reduce the size and strength needed from the gas spring as the amount of upward lift or counterbalance force being effectively provided by the gas spring to maintain a position of an arm assembly holding a monitor or other display device may be effectively increased as a result of the lower attachment point of end 38a of the gas spring for such embodiments. It should be understood that the moveable body 42a may move along the rotatable member vertically or substantially vertically by traveling along the length or a portion of the length of the rotatable member 42 that extends at an angle relative to being perfectly vertical.

In other embodiments, the receiving body 41 may be configured so that it moves relative to the first end 21 of the arm assembly. Movement of the rotatable member 42 may move the receiving body 41 relative to the first end 21 of the arm assembly or other portion of the arm assembly to adjust the vertical position of the first end 38a of the gas spring 38. For such embodiments, the first end 38a of the gas spring 38 may be attached directly to the receiving body 41.

In yet other embodiments, the first end 38a of the gas spring 38 may be attached directly to the rotatable member such that rotation of the rotatable member to vertically adjust a position of the rotatable member 42 moves the gas spring 38 as well.

Of course, the vertical adjustment mechanism used to attach the first end of the gas spring 38 to the arm assembly may also be used in other alternative arrangements, such as arm assemblies utilizing multiple linkages that have the vertical attachment mechanism positioned in a middle position of the arm assembly or positioned between ends of a particular arm linkage of the arm assembly. For example, it is contemplated that the vertical adjustment mechanism 40 may be attached to a middle portion of the arm assembly, and not an end of the arm assembly. For instance, an arm assembly may include two or more linkages that are interconnected and the gas spring may extend from a middle portion adjacent to a pivotal interconnection of the two linkages to a position adjacent to a terminal end of the arm assembly.

In some embodiments of the arm assembly, it is contemplated that the first end 38a of the gas spring 38 may be attached to an upper end of the support, such as an upper end of angled member 7, instead of being attached to an end of the arm assembly. Such embodiments may also utilize an attachment mechanism that permits vertical adjustment of the first end 38a of the gas spring 38. An example of such an attachment mechanism may be an embodiment of the attachment mechanism 40 discussed above that is configured for attachment to the angled member 7 or support post 5 instead of the first end 21 of the arm assembly.

While certain present preferred embodiments of the support apparatus, and methods of making and using the same have been shown and described above, it is to be distinctly understood that the invention is not limited thereto but may be otherwise variously embodied and practiced as may be appreciated by those of at least ordinary skill in the art. The invention may also be otherwise variously embodied and practiced within the scope of the following claims.

What is claimed is:

1. A support apparatus comprising:
   an arm assembly, the arm assembly having a first end and a second end;
   a support assembly attached to the arm assembly;
   a mounting device attached to the arm assembly, the mounting device sized to retain a display device;
   a counterbalance mechanism extending between the first end of the arm assembly and the second end of the arm assembly, the counterbalance mechanism having a first end and a second end opposite the first end;
   a vertically adjustable attachment mechanism attaching the first end of the counterbalance mechanism to one of: the arm assembly and the support assembly, the vertically adjustable attachment mechanism sized and shaped such that a vertical position of the first end of the counterbalance mechanism is adjustable, the vertically adjustable attachment mechanism comprising
      a receiving body immovably affixed to the first end of the arm assembly or the support assembly, the receiving body having a groove,
      a rotatable member that is attached to the receiving body, the rotatable member being rotatable in a first direction and in an opposite second direction,
      a nut or moveable body attached to or positioned on the first end of the counterbalance mechanism, the nut or moveable body also being moveably attached to the rotatable member such that rotation of the rotatable member causes the nut or moveable body to move along the rotatable member to change a vertical position of the first end of the counterbalance mechanism, rotation of the rotatable member in the first direction driving movement of the nut or moveable body to change the vertical position of the first end of the counterbalance mechanism to a higher location and rotation of the rotatable member in a second direction driving movement of the nut or moveable body to change the vertical position of the first end of the counterbalance mechanism to a lower position, and
      the nut or moveable body having a projection positioned within the groove of the receiving body such that the projection is mateable within the groove and prevents rotation of the nut or moveable body as the nut or moveable body is vertically moved along the rotatable member when the rotatable member rotates.

2. The support apparatus of claim 1 wherein the first end of the counterbalance mechanism has a hole that is sized to receive the rotatable member and the first end of the counterbalance mechanism is positioned on the nut or moveable body such that vertical movement of the nut or moveable body causes the first end to move vertically.

3. The support apparatus of claim 1 wherein the rotatable member is a bolt or a screw that has a length, the length extending substantially vertically.

4. The support apparatus of claim 1 wherein the receiving body is immovably affixed to the first end of the arm assembly such that the receiving body does not move independent of the first end of the arm assembly.

5. The support apparatus of claim 1 wherein the mounting device is sized and configured to releasably retain a mechanical tool and wherein the mechanical tool is engageable with a portion of the rotatable member while rotating to cause the rotatable member to rotate to adjust a vertical position of the first end of the counterbalance mechanism.

6. The support apparatus of claim 1 wherein the counterbalance mechanism is a gas spring.

7. The support apparatus of claim 1 wherein the arm assembly is comprised of a first arm positioned between the first end and the second end of the arm assembly, the vertically adjustable attachment mechanism being attached to the first arm for directly attaching the first end of the counterbalance mechanism to the first end of the arm assembly, the counterbalance mechanism extending from the first end of the arm assembly to adjacent the second end of the arm assembly; and
   wherein the nut or moveable body does not rotate and moves linearly along the rotatable member when the rotatable member rotates.

8. The support apparatus of claim 1 further comprising a mounting mechanism attached to the support assembly, the mounting mechanism being comprised of a clamp and wherein the mounting device comprises a mounting plate sized and configured for attachment to the display device.

9. The support apparatus of claim 8 wherein the counterbalance mechanism is a gas spring.

10. The support apparatus of claim 8 wherein the arm assembly is comprised of a first arm member positioned between the first end and the second end of the arm assembly, the vertically adjustable attachment mechanism being attached to an end of the first arm member for directly attaching the first end of the counterbalance mechanism to the arm assembly and wherein the mounting device is attached to the second end of the arm assembly.

11. The support apparatus of claim 8 wherein the arm assembly is comprised of at least one arm member.

12. The support apparatus of claim 8 wherein the rotatable member is a bolt or screw.

13. The support apparatus of claim 8 wherein the arm assembly is comprised of a first arm positioned between the first end and the second end of the arm assembly, the vertically adjustable attachment mechanism being attached to the first arm for directly attaching the first end of the counterbalance mechanism to the first end of the arm assembly, the counterbalance mechanism extending from the first end of the arm assembly to adjacent the second end of the arm assembly.

14. The support apparatus of claim 8 further comprising a mechanical tool and wherein the mounting device releasably retains the mechanical tool and wherein the mechanical tool is engageable with the rotatable member while rotating to rotate the rotatable member to adjust a vertical position of the first end of the counterbalance mechanism.

* * * * *